March 6, 1962
J. K. UDELMAN
3,023,870
AUXILIARY BRAKE FOR VEHICLES EMPLOYING IGNITION
ADVANCE FEATURE AND EXHAUST VALVE
OPENING ADVANCE FEATURE
Filed Feb. 15, 1960
2 Sheets-Sheet 1
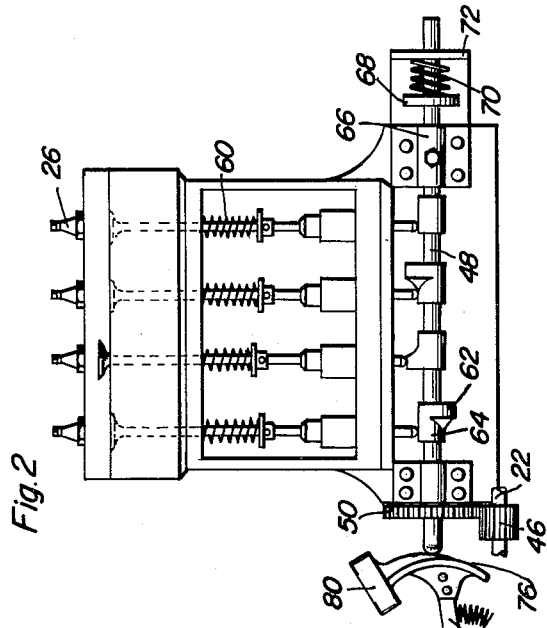
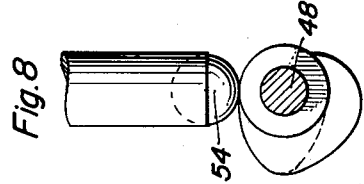
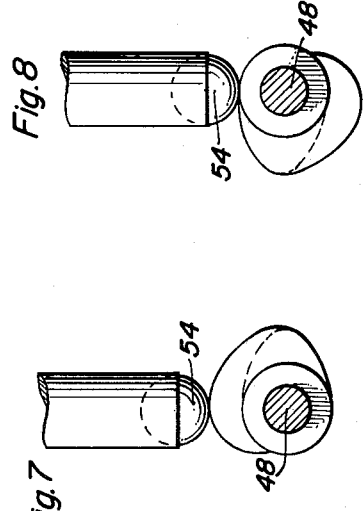
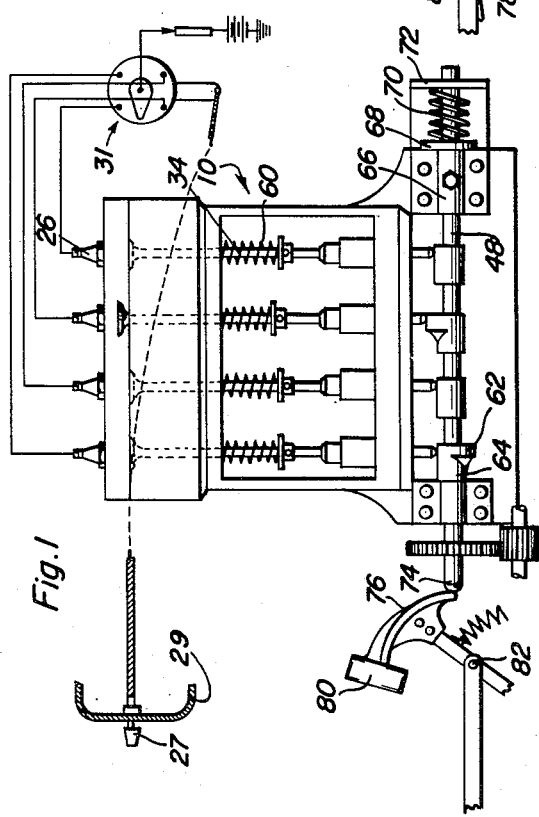
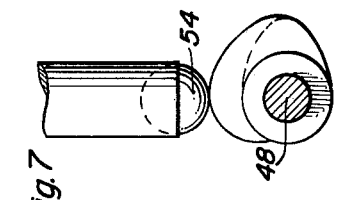
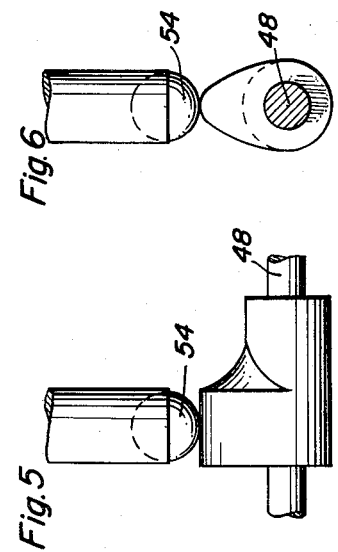
Jaime K. Udelman
INVENTOR.
BY *Clarence A. O'Brien*
*and Harvey B. Jacobson*
Attorneys March 6, 1962
J. K. UDELMAN
3,023,870
AUXILIARY BRAKE FOR VEHICLES EMPLOYING IGNITION
ADVANCE FEATURE AND EXHAUST VALVE
OPENING ADVANCE FEATURE
Filed Feb. 15, 1960
2 Sheets-Sheet 2
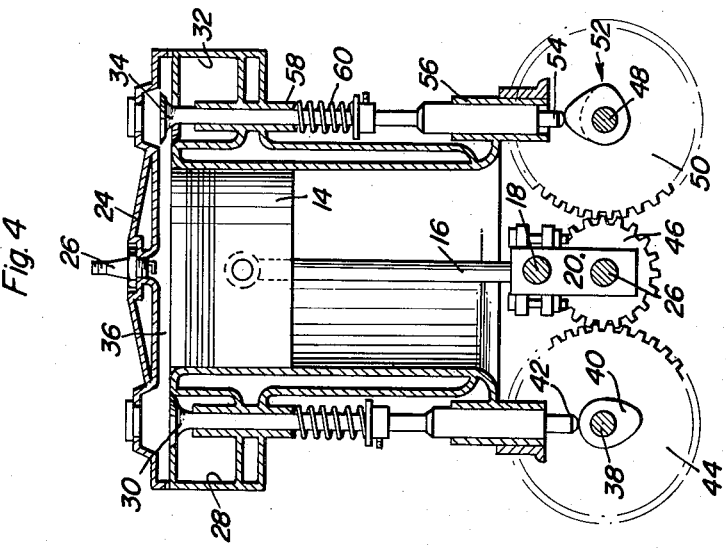
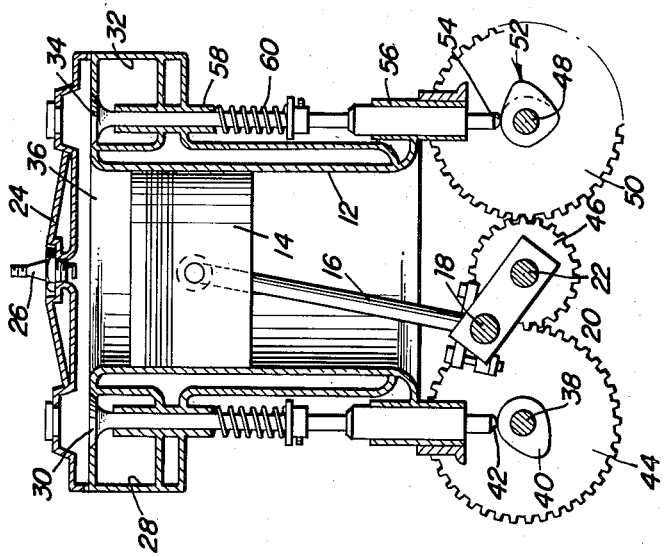
Jaime K. Udelman
INVENTOR.
BY Clarence A. O'Brien
and Harvey B. Jacobson
Attorneys

# United States Patent Office 3,023,870
Patented Mar. 6, 1962

3,023,870
AUXILIARY BRAKE FOR VEHICLES EMPLOYING IGNITION ADVANCE FEATURE AND EXHAUST VALVE OPENING ADVANCE FEATURE
Jaime K. Udelman, Avenida M. Felipe Tovar, Edificio "Hena," Apt. 3, San Bernardino, Caracas, Venezuela
Filed Feb. 15, 1960, Ser. No. 8,861
6 Claims. (Cl. 192—3)

The present invention generally relates to an auxiliary brake for motor vehicles employing an internal combustion engine for their motive power and more particularly relates to an arrangement whereby the internal combustion engine itself will act as a retarding force or brake for the vehicle.

Automotive vehicles normally are provided with an internal combustion engine for propulsion and are also normally provided with brakes associated with the wheels which employ movable brake shoes for engagement with a brake drum whereby friction is employed for retarding movement of a vehicle. Such brakes operate effectively for some purposes but quite often become ineffective due to excessive use, wear and a buildup of heat. This is especially a problem in areas where the vehicle must proceed down long hills or grades. During such descent, the internal combustion engine is normally just idling and is actually being driven by the driving wheels of the vehicle due to the force of gravity. Therefore, it is a primary object of the present invention to provide an arrangement whereby the internal combustion engine will act as a retarding force for the driving wheels for reducing the speed of the vehicle without requiring the use of brake shoes or the like.

The present invention is incorporated into vehicular structures in which the internal combustion engine is provided with a manually operated ignition advance device whereby the point of ignition may be varied in relation to the position of the piston during the compression stroke so that the point of ignition may be advanced to occur when the piston is substantially three-quarters of the way up on its compression stroke, that is, the piston is one-quarter of the way from reaching its top dead center point. The invention is also incorporated into an internal combustion engine having separate cam shafts operating the intake valves and the exhaust valves. The intake valve cam shaft will be of conventional structure but the exhaust valve cam shaft will be longitudinally movable and provided with two sets of cams, one of which will operate the exhaust valve when the internal combustion engine is operated in the normal manner for propelling the vehicle, the other set of cams being operated when the engine is being employed as a brake whereby the other set of cams will be moved longitudinally and will open the exhaust valve at the top dead center position of the piston as the piston is in its transition from the compression stroke to the power stroke thereby assuring that there will be no power stroke of the piston and also assuring that ignition of the compressed combustion products will occur during the compression stroke as the piston approaches top dead center thereby assuring application of force on the top of the piston only during the upward movement thereof during the compression stroke for retarding rotation of the crankshaft and thus rotation of the drive wheels for slowing down the vehicle.

It is an object of the present invention to provide an auxiliary brake in accordance with the preceding object that is relatively simple in construction, easy to operate, foolproof, semi-automatic in operation and generally inexpensive to manufacture and install.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of an internal combustion engine employing the auxiliary brake of the present invention with the exhaust valve cam shaft in normal operating condition and with the foot brake in the off position;

FIGURE 2 is a side elevational view similar to FIGURE 1 but with the exhaust valve cam shaft in position for opening the exhaust valve at top dead center of the piston during its transition from a compression stroke to a power stroke;

FIGURE 3 is a vertical sectional view illustrating one of the pistons and cylinders of the present invention together with the orientation of the intake and exhaust valve assemblies and the other structural features of the invention with the piston being in position in which the compressed combustion products are ignited for retarding upward movement of the piston;

FIGURE 4 is a sectional view similar to FIGURE 3 but with the piston at top dead center at which time the exhaust cam on the slidable cam shaft has opened the exhaust valve for enabling discharge of the combustion products thereby preventing any power stroke of the piston;

FIGURE 5 is a detailed side elevational view of the cam structure and the follower engaging the one cam of a pair on the shaft;

FIGURE 6 is an end view of the construction of FIGURE 5;

FIGURE 7 is an end view of the exhaust valve cam shaft illustrating the follower engaging the other cam of the pair of cams;

FIGURE 8 is a view similar to FIGURE 7 but illustrating the cam follower on the modified cam.

Referring now specifically to the drawings, the numeral 10 generally designates an internal combustion engine with which the auxiliary brake structure of the present invention is incorporated and the internal combustion engine is of the multicylinder type having a plurality of cylinders 12, each having a piston 14 reciprocating therein. Each of the pistons 14 is connected to the usual connecting rod 16, the lower end of which is connected to an eccentric journal 18 carried by a crank throw or arm 20 rigid with the usual crankshaft 22. A cylinder head 24 is provided for the cylinder and is equipped with an ignition device such as a spark plug 26. An intake manifold 28 is communicated with the cylinder 12 by virtue of an intake valve 30. An exhaust manifold 32 is communicated with the combustion chamber by virtue of an exhaust valve 34. The combustion chamber is designated by numeral 36 and is that area disposed between the top of the piston 14 and the undersurface of the cylinder head 24 and normally receives a combustible mixture from the intake manifold 28 when the intake valve 30 is opened during the intake stroke. Subsequently, the piston 14 is elevated by the crankshaft 22 for compressing the combustible mixture. The details of the carburetor or other fuel and air mixing device is not illustrated and the details of this feature are not important to the present invention. This is also true for the device for supplying electrical impulses to the ignition device 26. However, the ignition system is of the type that may be adjusted as to the point of ignition. As illustrated schematically in FIGURE 1 there is normally provided a manual control device 27 on the dashboard 29 of the vehicle for advancing the spark or ignition of the engine by shifting the position of a contact mounting plate in a distributor assembly 31. For the purposes of this invention, the ignition timing is advanced to a point that the compressed mixture will be ignited as the piston 14 is moving upwardly on its compression stroke at a point of the piston substantially as the piston reaches its three-quarter mark or approximately 45 degrees before top dead center of the piston on its compression stroke. This position is substantially illustrated in FIGURE 3.

FIGURE 4 illustrates the position of the piston 14 at its top dead center position after the compression stroke and after ignition and illustrates the exhaust valve 34 being open to discharge the products of combustion while the piston 14 is at top dead center thereby preventing any possible power stroke since the exhaust valve 34 will open fully before the piston 14 starts downward on what would normally be the power stroke but which in this instance is not a power stroke since the exhaust valve 34 has already opened. Thus, due to ignition of the combustion products as the piston 14 approached dead center, the forces exerted on the piston 14 would tend to stop rotation of the crankshaft 22 and, in fact, would tend to rotate it in a reverse direction. This, of course, will retard or reduce the speed of the crankshaft and correspondingly the driving wheels of the vehicle.

The intake valves 30 are operated by an intake valve cam shaft 38 having a plurality of cams 40 rigidly disposed thereon with a follower 42 riding on the surface of the cams 40 for reciprocating the intake valves 30 in proper time relationship to the reciprocation of the piston 14 in the usual manner. The intake valve cam shaft 38 is driven by an enlarged gear 44 in meshing engagement with a pinion 46 driven by the crankshaft 22. Thus, the intake valve 30 will operate in the usual manner for opening on the intake stroke of the piston 14 for admitting a fuel and air mixture into the combustion chamber in the usual manner.

The exhaust valves 34 are reciprocated by an exhaust valve cam shaft 48 driven by an enlarged gear 50 in sliding meshing engagement with the pinion 46. For operating each of the valves 34, there is provided a double cam assembly generally designated by numeral 52 for engagement with a follower 54 on an exhaust valve 34 which is slidably received in guides 56 and 58 and which are spring urged to a closed position by compression spring 60 all of which represents conventional construction. The double cam assembly 52 includes what actually may be termed two separate cams 62 and 64 which are selectively engageable with the follower 54 for opening the exhaust valve in the conventional manner such as when the piston approaches bottom dead center on the power stroke or opening the exhaust valve as the piston reaches top dead center on the compression stroke and just prior to its descent on the power stroke thereby discharging the combustion products so that they may expand out through the exhaust opening and manifold rather than against the top of the piston.

The cam shaft 48 is slidably received within bearings 66 and one end of the cam shaft 48 is provided with a thrust washer 68 having a compression coil spring 70 engaged therewith and encircling the shaft 48. The other end of the spring 70 engages an abutment 72 whereby the shaft 48 will be urged to a position with the conventional cam 62 engaging the follower 54. The other end of the cam shaft 48 is provided with a rounded end 74 in sliding contact with a cam 76 carried by the foot brake pedal 78 having the usual foot pedal 80 thereon. The foot brake pedal 78 is pivotally supported at pivot point 82 and when the pedal 80 is depressed, the cam 76 riding against the end 74 will cause the cam shaft 48 to slide longitudinally to bring the cams 64 of each cam assembly 52 into registry with the follower 54 for opening the exhaust valve immediately at top dead center of the piston before it descends on its power stroke. The spring 70 will return the cam shaft to its normal position. Further, with the structure of the present invention, a very effective auxiliary brake is provided and this brake may be incorporated into internal combustion engines with very little modification. Further, the degree of the braking action may be determined by the position of the accelerator pedal since the force exerted on the piston as it rises to top dead center on the compression stroke will be determined by the quantity of fuel in the combustion chamber. Thus, as the accelerator pedal is depressed for admitting more fuel while the brake pedal is depressed, the increased fuel supply will increase the retarding action exerted by pressure against the top of the piston before it reaches top dead center on the compression stroke.

The area of the cam shaft between the two cams is smoothly curved and inclined for enabling the follower to ride along the cam shaft as the shaft is shifted longitudinally in response to movement of the brake pedal.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An auxiliary brake for a vehicular mounted internal combustion engine comprising a sliding cam shaft for the engine exhaust valves, a foot pedal for operating the vehicle brake, and means interconnecting the foot pedal and the cam shaft for sliding the cam shaft longitudinally upon movement of the foot pedal for adjusting the point of opening of the exhaust valve so that the exhaust valve will open at top dead center position of the piston on its compression stroke prior to the power stroke.

2. The structure as defined in claim 1 wherein said cam shaft is provided with a drive gear on one end thereof in sliding meshing engagement with a pinion carried by the crankshaft of the engine, and spring means engaged with the cam shaft for urging the cam shaft to a position with the cams thereon engaging the exhaust valves for opening the exhaust valves adjacent bottom dead center of the power stroke for use of the engine as a propelling device.

3. The structure as defined in claim 1 wherein said foot pedal is provided with a cam surface in engagement with one end of the cam shaft for moving the cam shaft longitudinally upon depression of the foot pedal.

4. In combination with an internal combustion engine for vehicles having a cylinder, a reciprocating piston in said cylinder, a variable ignition timing system for igniting a combustible mixture in the cylinder and a variable combustible mixture supply communicating with the cylinder, an exhaust valve for discharging the combustion products, and a movable cam shaft for operating said exhaust valve, said cam shaft including a pair of cams with one cam of said pair having a face for opening the exhaust valve near bottom dead center of the power stroke piston, the other cam of said pair having a face for opening the exhaust valve adjacent top dead center of the compression stroke of the piston before the piston starts downwardly on a power stroke thereby exhausting the combustion products before a power stroke can occur so that ignition of the combustion products may be advanced to a point before top dead center of the compression stroke thereby retarding rotation of the crank shaft of the engine, and means engaged with the cam shaft and adapted to operate in response to application of the vehicular brake for moving the cam shaft from a position for opening the exhaust valve adjacent bottom dead center of the power stroke to a position for opening the exhaust valve adjacent top dead center of the compression stroke.

5. The structure as defined in claim 4 wherein said means for moving the cam shaft includes a brake pedal having a cam surface thereon, one end of said cam shaft riding on said cam surface for movement longitudinally upon depression of the pedal, and spring means engaging the cam shaft for urging the cam shaft in the other direction for retaining the end of the cam shaft against the cam surface on the pedal.

6. A brake assembly for vehicles having an internal combustion engine comprising a movable cam shaft for operating an exhaust mechanism of an engine, two sets of cams mounted on said cam shaft, one set of cams adapted to open the exhaust mechanism after the power cycle, the other set of cams adapted to open the exhaust mechanism before the power cycle, and manually operated means connected to said cam shaft for moving the cam shaft longitudinally to selectively render the sets of cams effective.

References Cited in the file of this patent

UNITED STATES PATENTS

| | | |
|---|---|---|
| 1,160,659 | Schwerdtfeger | Nov. 16, 1915 |
| 2,156,560 | Bachmann | May 2, 1939 |
| 2,178,152 | Walker | Oct. 31, 1939 |
| 2,528,983 | Weiss | Nov. 7, 1950 |